United States Patent
Abdoli et al.

(10) Patent No.: US 10,903,949 B2
(45) Date of Patent: Jan. 26, 2021

(54) METHOD AND SYSTEM FOR MULTIPLE ACTIVE BANDWIDTH PARTS PER CARRIER

(71) Applicant: Huawei Technologies Co., Ltd., Shenzhen (CN)

(72) Inventors: Javad Abdoli, Kanata (CA); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/407,404

(22) Filed: May 9, 2019

(65) Prior Publication Data
US 2020/0021407 A1 Jan. 16, 2020

Related U.S. Application Data

(60) Provisional application No. 62/696,146, filed on Jul. 10, 2018.

(51) Int. Cl.
*H04L 5/00* (2006.01)
*H04W 72/04* (2009.01)
*H04W 72/12* (2009.01)

(52) U.S. Cl.
CPC ......... *H04L 5/0039* (2013.01); *H04W 72/042* (2013.01); *H04W 72/0446* (2013.01); *H04W 72/0453* (2013.01); *H04W 72/1231* (2013.01)

(58) Field of Classification Search
CPC ..... H04L 5/001; H04L 5/0039; H04L 5/0053; H04L 5/0098; H04W 72/042; H04W 72/0446; H04W 72/0453; H04W 72/1231
See application file for complete search history.

(56) References Cited

U.S. PATENT DOCUMENTS

| | | | | |
|---|---|---|---|---|
| 10,687,252 | B2* | 6/2020 | Manolakos | ....... H04W 72/0453 |
| 2019/0165902 | A1* | 5/2019 | Li | ......................... H04L 5/0094 |
| 2019/0182000 | A1* | 6/2019 | Futaki | ............... H04W 36/0088 |

(Continued)

FOREIGN PATENT DOCUMENTS

CN 107493605 A 12/2017

OTHER PUBLICATIONS

"3rd Generation Partnership Project; Technical Specification Group Radio Access Network; NR; Physical channels and modulation (Release 15)", 3GPP TS 38.211 V15.6.0, Jun. 2019, 93 Pages.

(Continued)

*Primary Examiner* — Saad A. Waqas
(74) *Attorney, Agent, or Firm* — Slater Matsil, LLP

(57) ABSTRACT

Devices and methods are provided that include transmitting or receiving data and control signals over an air interface on a plurality of bandwidth part (BWP) groups (BWGs) of a carrier, wherein each BWG comprises a plurality of BWPs and each BWP is a set of contiguous resource blocks (RBs). The control signals are transmitted or received on an active BWP of at least one of the BWGs and the data signals are transmitted or received on active BWPs of at least two of the BWGs. Devices and methods are also provided that include transmitting or receiving data and control signals over an air interface on a plurality of active BWPs of a carrier, wherein each active BWP is a set of contiguous RBs, wherein control signals are transmitted or received on at most one active BWP at a time.

24 Claims, 9 Drawing Sheets

(56) References Cited

U.S. PATENT DOCUMENTS

2019/0215870 A1* 7/2019 Babaei ............... H04W 72/042
2019/0289513 A1* 9/2019 Jeon ..................... H04W 52/40

OTHER PUBLICATIONS

"3rd Generation Partnership Project; Technical Specification Group Radio Access Network; NR; Physical layer procedures for control (Release 15)", 3GPP TS 38.213 V15.6.0, Jun. 2019, 107 Pages.
Huawei, et al., "Bandwidth part activation and adaptation", 3GPP TSG RAN WG1 Meeting NR Ad Hoc#3, R1-1715571, Sep. 18-21, 2017, 5 Pages, Nagoya, Japan.
Qualcomm Incorporated, "Advanced Grant Indication for UE Power Saving", 3GPP TSG RAN WG1 NR Ad-Hoc#2, R1-1711187, Jun. 27-30, 2017, 5 Pages, Qingdao, P.R. China.

* cited by examiner

METHOD AND SYSTEM FOR MULTIPLE ACTIVE BANDWIDTH PARTS PER CARRIER

CROSS REFERENCE TO RELATED APPLICATIONS

This application claims the benefit of priority to U.S. Provisional Patent Application Ser. No. 62/696,146 filed Jul. 10, 2018 and entitled "Method and System for Multiple Active Bandwidth Parts per Carrier" the contents of which are incorporated herein by reference.

TECHNICAL FIELD

The present invention relates generally to a system and method for wireless communications, and, in particular embodiments, to a system and method for wireless communications over multiple bandwidth parts (BWPs) per carrier.

BACKGROUND

An air interface is the wireless communications link between two or more communicating devices, such as a radio access network device (e.g., a base station, base transceiver station (BTS), a Node-B (NodeB), an evolved NodeB (eNodeB), a Home eNodeB, a gNodeB, a transmission point (TP), a site controller, an access point (AP), or a wireless router) and an electronic device (ED) (e.g., a user equipment (UE), a mobile phone, a sensor, a camera). Typically, both communicating devices need to know specific parameters of the air interface in order to successfully transmit and receive a transmission.

Configuring the communicating devices with the same air interface parameters allows the communicating devices to reliably identify, organize and use physical resources, such as time, frequency, or time and frequency resources. Frequency resources are typically defined relative to a "carrier", which is a signal of a given frequency that used to modulate (or "carry") information. A bandwidth of the carrier defines the frequency resources that may be allocated for a transmission from a network access device to an ED, or from an ED to a network access device. For example, a carrier may have a bandwidth of 1.4, 3, 5, 10, 15 or 20 MHz. In some situations, an ED may be configured with multiple carriers (e.g., carrier aggregation) to extend the usable bandwidth for wireless transmission.

A carrier may be divided into a number of bandwidth parts (BWPs), which consist of a number of contiguous resource blocks (RBs) within the carrier and are specific to an ED. Dividing the carrier into multiple BWPs may enable efficiencies, particularly at the ED. For example, the ED may only need to monitor the smaller bandwidth of a given BWP, rather than the entire carrier bandwidth.

In current wireless communications systems, transmissions are typically communicated in accordance with one pre-defined configuration for the air interface. Modern wireless networks, however, are increasingly used to support communications of diverse traffic types, which may have different characteristics and quality of service (QoS) requirements, such as latency, throughput, and simultaneous connections. Consequently, the different traffic types of modern wireless networks are not well-suited for a one-size-fits-all air interface configuration. It is desirable to increase the flexibility and efficiency of the air interface configuration for an ED.

SUMMARY

Technical advantages are generally achieved by embodiments of this disclosure which describe a system and method for transmission over a least one active bandwidth part of a carrier.

According to an aspect of the present disclosure there is provided a method involving transmitting or receiving data and control signals over an air interface on a plurality of bandwidth part (BWP) groups (BWGs) of a carrier, wherein each BWG comprises a plurality of BWPs and each BWP is a set of contiguous resource blocks (RBs), the control signals transmitted or received on an active BWP of at least one of the BWGs, and the data signals transmitted or received on active BWPs of at least two of the BWGs.

In some embodiments, at most one BWP in each BWG of the plurality of BWGs is active at a time for transmitting or receiving.

In some embodiments, the method further involves receiving an indication of a number of BWGs configured in the carrier.

In some embodiments, the plurality of BWGs comprises at least a first BWG and a second BWG, and the control signals include signals for scheduling data in a first active BWP in the first BWG.

In some embodiments, the control signals further include signals for switching from the first active BWP in the first BWG to a second active BWP in the first BWG.

In some embodiments, switching from the first active BWP in the first BWG to the second active BWP in the first BWG comprises deactivating the first active BWP in the first BWG and activating the second active BWP in the first BWG.

In some embodiments, the control signals further include signals for scheduling data in a first active BWP in the second BWG.

In some embodiments, the control signals further include signals for switching from the first active BWP in the second BWG to a second active BWP in the second BWG.

In some embodiments, switching from the first active BWP in the second BWG to the second active BWP in the second BWG comprises deactivating the first active BWP in the second BWG and activating the second active BWP in the second BWG.

In some embodiments, the control signals are received in the first active BWP in the first BWG.

In some embodiments, only BWPs in the first BWG include a control resource set (CORESET).

In some embodiments, the control signals are received in the first active BWP in the second BWG.

In some embodiments, the method further involves receiving parameter configuration information to configure particular parameters on a BWG basis.

In some embodiments, the particular parameters include at least one of: control resource set (CORESET) configuration parameters; search space set configuration parameters; physical downlink shared channel (PDSCH) configuration parameters; physical uplink shared channel (PUSCH) configuration parameters; channel quality indicator (CQI) table configuration parameters; target block error rate (BLER) configuration parameters for CQI feedback; and modulation and code scheme table configuration parameters.

In some embodiments, one BWP in a BWG is designated a primary BWP and the method further involves: receiving parameter configuration information used to configure the UE for receiving data and control signals in the primary BWP of the BWG; utilizing the parameter configuration information for the primary BWP when configuring for receiving data and control signals in remaining BWPs in the BWG.

In some embodiments, the second BWG is activated or deactivated by receiving one of: higher-layer signaling; media access control (MAC) control element (CE); or downlink control information (DCI).

In some embodiments, receiving the DCI to activate the second BWG comprises receiving: a UE specific DCI; or a group common DCI.

In some embodiments, activating the second BWG is performed by receiving an activation signal for at least one BWP of the second BWG.

In some embodiments, the method further involves receiving an indication of an association between a BWP and a BWG.

In some embodiments, receiving an indication of an association between a BWP and a BWG comprises receiving: an indication of the BWPs that a BWG is associated with; or an indication of the BWGs that BWP is associated with.

In some embodiments, receiving an indication of the BWPs that a BWG is associated with involves: receiving an indication of a number of BWPs associated with the BWG and BWP identifiers (IDs) for each of the BWPs associated with the BWG; or receiving a bitmap having a number of bits equal to a number of configured BWPs of the carrier and wherein the BWPs associated with the BWG are indicated in the bitmap.

In some embodiments, receiving an indication of the BWGs that a BWP is associated with involves one of: for each BWP, receiving a BWG identifier (ID) that the BWP is associated with; for each BWP, receiving an indication of a number of BWGs that the BWP is associated with and the BWG ID for each of the BWGs that the BWP is associated with; or for each BWP, receiving a bitmap having a number of bits equal to a number of configured BWGs in the carrier and wherein the BWGs associated with the BWP are indicated in the bitmap.

In some embodiments, the method further involves receiving an identification of a default BWP in a BWG.

In some embodiments, the method further involves receiving an identification of a first active BWP in a BWG.

In some embodiments, more than one BWP group is configured for a UE.

In some embodiments, more than one BWP group is configured for use over a Uu interface between a base station and a UE; or more than one BWP group is configured for sidelink connection between UEs.

In some embodiments, at least one BWP group is configured for use over a Uu interface between a base station and the UE and at least one BWP group is configured for a sidelink connection between UEs.

In some embodiments, the method is performed by a user equipment.

In some embodiments, the method is performed by a radio access network device.

According to an aspect of the present disclosure there is provided a user equipment (UE) including: at least one antenna; a processor; and a processor readable memory, having stored thereon, processor executable instructions, that when executed perform a method described above or detailed below.

According to an aspect of the present disclosure there is provided a radio access network device including: at least one antenna; a processor; and a processor readable memory, having stored thereon, processor executable instructions, that when executed perform a method described above or detailed below.

According to an aspect of the present disclosure there is provided a method involving: transmitting or receiving data and control signals over an air interface on a plurality of active bandwidth parts (BWPs) of a carrier, wherein each active BWP is a set of contiguous resource blocks (RBs), wherein control signals are transmitted or received on at most one active BWP at a time.

In some embodiments, the control signals include signals for scheduling data in an active BWP.

In some embodiments, the control signals are transmitted or received on a first active BWP for scheduling data in a second active BWP without deactivating the first active BWP.

In some embodiments, the control signals are transmitted or received on a first active BWP for activating a second active BWP without deactivating the first active BWP.

In some embodiments, the control signals are transmitted or received on a first active BWP for activating a third active BWP and deactivating the second active BWP.

In some embodiments, the first active BWP is a primary BWP.

In some embodiments, the control signals are transmitted or received on a first active BWP for switching the primary BWP from the first active BWP to the second active BWP.

In some embodiments, switching the primary BWP from the first active BWP to the second active BWP further comprises deactivating the first active BWP.

In some embodiments, the method further involves receiving an indication of the primary BWP.

In some embodiments, the control signals are transmitted or received on a first active BWP for deactivating a second active BWP.

In some embodiments, the control signals for deactivating the second active BWP are one of: higher layer signaling, media access control (MAC) control element (CE), or downlink control information (DCI).

In some embodiments, a first active BWP is deactivated by a BWP deactivation timer or is deactivated implicitly.

In some embodiments, the first active BWP is deactivated implicitly when the number of active BWPs exceeds a threshold.

In some embodiments, the method is performed by a user equipment.

In some embodiments, the method is performed by a base station.

According to an aspect of the present disclosure there is provided a user equipment (UE) including: at least one antenna; a processor; and a processor readable memory, having stored thereon, processor executable instructions, that when executed perform a method described above or detailed below.

According to an aspect of the present disclosure there is provided a radio access network device including: at least one antenna; a processor; and a processor readable memory, having stored thereon, processor executable instructions, that when executed perform a method described above or detailed below.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Conventionally, cellular wireless communications only support one active BWP for an ED at any given time. Aspects of the disclosure relate to utilizing multiple active bandwidth parts (BWPs) for flexible and efficient resource configuration for an ED.

The following paragraphs provide context in the form of the description of an overall system that includes both base stations and electronic devices served by the base stations.

Figure 1:
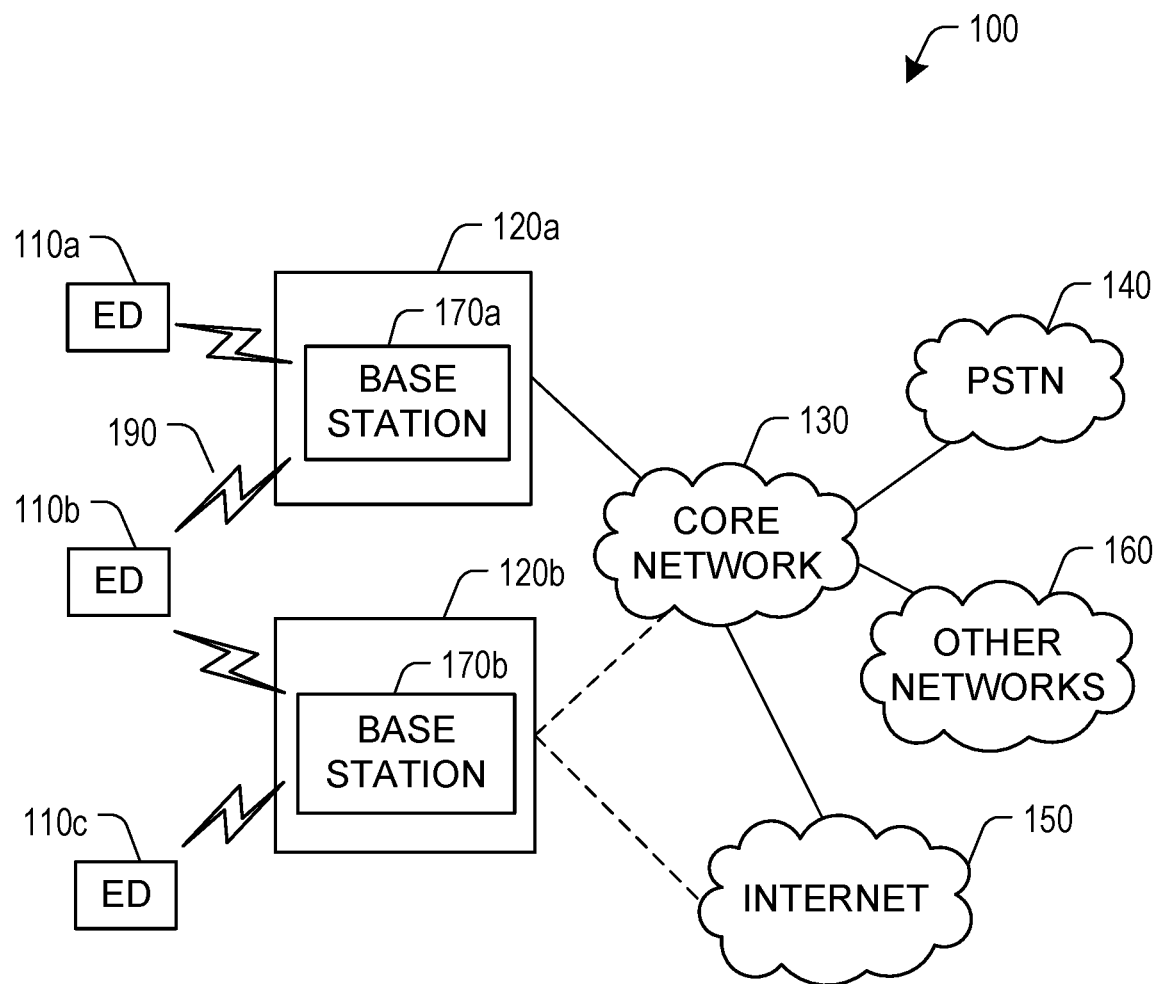
FIG. 1 is a network diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a, 110b and 110c, radio access networks (RANs) 120a and 120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a, 110b and 110c are configured to operate in the communication system 100. For example, the EDs 110a, 110b and 110c are configured to transmit, receive, or both via wireless or wired communication channels. Each ED 110a, 110b and 110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a and 120b include base stations 170a and 170b, respectively. Each base station 170a and 170b is configured to wirelessly interface with one or more of the EDs 110a, 110b and 110c, the core network 130, the PSTN 140, the internet 150, and/or the other networks 160. For example, the base stations 170a and 170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a, 110b and 110c may be alternatively or additionally configured to interface, access, or communicate with any other base station 170a and 170b, the internet 150, the core network 130, the PSTN 140, the other networks 160, or any combination of the preceding. The communication system 100 may include RANs, such as RAN 120b, wherein the corresponding base station 170b accesses the core network 130 or the internet 150, as shown.

The EDs 110a-110c and base stations 170a and 170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), and/or relay nodes. The functions of a base station 170a and 170b may be localized to a single location, as shown, or be distributed within the network, such as distributed in the corresponding RAN. Also, the base station 170b forms part of the RAN 120b, which may include other base stations. Each base station 170a and 170b transmits and/or receives wireless signals within a particular geographic region or area, sometimes referred to as a "cell" or "coverage area". A cell may be further divided into cell sectors, and a base station 170a and 170b may, for example, employ multiple transceivers to provide service to multiple sectors. In some embodiments, there may be established pico or femto cells if they are supported by the radio access technology. In some embodiments, multiple transceivers could be used for each cell, for example using multiple-input multiple-output (MIMO) technology. The number of RAN 120a and 120b shown is an example only. Any number of RAN may be contemplated when devising the communication system 100.

The base stations 170*a* and 170*b* communicate with one or more of the EDs 110*a*, 110*b* and 110*c* over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170*a* and 170*b* may implement Universal Mobile Telecommunication System (UMTS) Terrestrial Radio Access (UTRA) to establish an air interface 190 using wideband CDMA (WCDMA). In doing so, the base station 170*a* and 170*b* may implement protocols such as High Speed Packet Access (HSPA), Evolved HSPA (HSPA+) optionally including High Speed Downlink Packet Access (HSDPA), High Speed Packet Uplink Access (HSUPA), or both. Alternatively, a base station 170*a*-170*b* may establish an air interface 190 with Evolved UTMS Terrestrial Radio Access (E-UTRA) using Long-Term Evolution (LTE), LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120*a* and 120*b* are in communication with the core network 130 to provide the EDs 110*a*, 110*b* and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a*, 110*b* and 110*c* or both, and (ii) other networks (such as the PSTN 140, the internet 150, and the other networks 160). In addition, some or all of the EDs 110*a*, 110*b* and 110*c* may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as (Internet Protocol (IP), Transmission Control Protocol (TCP), and User Datagram Protocol (UDP). EDs 110*a*, 110*b* and 110*c* may be multimode devices capable of operation according to multiple radio access technologies, and incorporate multiple transceivers necessary to support such.

In embodiments of the present invention, the communications system 100 is a heterogeneous communications system with different transmission source types and/or different transmission destination types. The different transmission source types may have different transmission capabilities. The different transmission destination types may have different reception capabilities.

In the heterogeneous communications system, the EDs 110*a*, 110*b* and 110*c* of FIG. 1 include different types of devices having different capabilities and requirements. More specifically, each ED 110*a*, 110*b* and 110*c* may be associated with a different traffic type having particular requirements for QoS, latency, throughput, simultaneous connections, etc. Example EDs 110*a*, 110*b* and 110*c* associated with different traffic types may include a smartphone, a computer, a television, a security camera, a sensor, a thermostat, a heart rate monitor, etc. In a particular example, ED 110*a* is a computer, ED 110*b* is a sensor, and ED 110*c* is a heart rate monitor. Each of the EDs 110*a*, 110*b* and 110*c* may have different wireless communication capabilities and requirements.

Furthermore, in a heterogeneous communications system, the base stations 170*a*-170*b* may communicate with one or more of the EDs 110*a*, 110*b* and 110*c* over one or more software-configurable air interfaces 190 using wireless communication links. The different radio access network devices (e.g., base stations 170*a* and 170*b*) and electronic devices (e.g., ED 110*a*, 110*b* and 110*c*) may have different transmission capabilities and/or requirements. As an example, an eNB may have multiple transmit antennas. A picocell may only have one transmit antenna or a relatively small number of transmit antennas. Additionally, a picocell may transmit at a lower maximum power level as compared to an eNB. Similarly, a computer may have much higher data bandwidth requirement and signal processing capability than a sensor. For another example, a heart rate monitor may have much stricter latency and reliability requirements than a television.

Therefore, in a heterogeneous communications system, such as heterogeneous communications system 100, different pairs of communicating devices (i.e., a network device and an electronic device; or a network device and another network device; or an electronic device and another electronic device) may have different transmission capabilities and/or transmission requirements. The different transmission capabilities and/or transmission requirements can be met by the availability to select different air interface configurations for different devices, communications, or requirements.

In fifth generation (5G) New Radio (NR), different devices and services are expected to have different requirements for wireless communication. For example, some devices may require low-latency communication (e.g., less than 0.5 ms round trip) with high reliability (e.g., less than $10^{-5}$ block error rate (BLER)). These devices are proposed to communicate in a framework sometimes known as ultra-reliable low-latency communication (URLLC). URLLC may be unpredictable and sporadic in nature, and may not require a high data rate depending on the application. URLLC may be used in either uplink (UL) or downlink (DL), and may be particularly applicable in cases such as vehicle-to-vehicle (V2V) communication for coordinating automobile traffic.

To satisfy the latency and reliability requirements of URLLC communication, a number of features are proposed that differ from conventional Long Term Evolution (LTE) communication and from NR enhanced mobile broadband (eMBB) communication.

In some examples, a portion of network resources, for example time-frequency resources such as one or more bandwidth parts (BWPs), is reserved for URLLC traffic and a different portion of network resources is reserved for eMBB traffic. Network resources that are used for URLLC traffic may be configured to increase flexibility or reduce latency, for example by having a finer granularity or periodicity of scheduling than the slot-based scheduling of eMBB, or a shorter minimum duration. URLLC transmissions in the physical downlink shared channel (PDSCH) or the physical uplink shared channel (PUSCH) may be as short as two symbols. The first symbol of an URLLC transmission may include a demodulation reference signal (DMRS).

Figure 2:
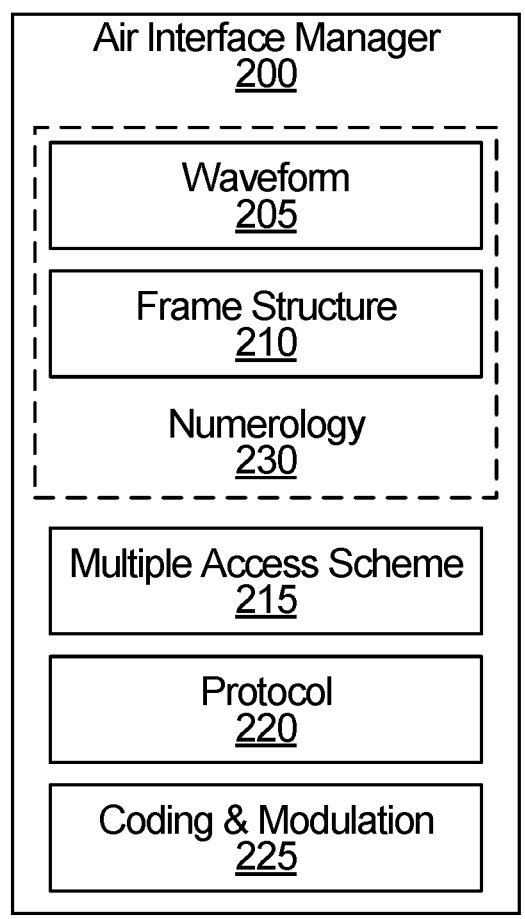
FIG. 2 is a block diagram of an air interface manager for configuring a software-configurable air interface.

FIG. 2 illustrates a schematic diagram of an air interface manager 200 for configuring a software-configurable air interface 190. Air interface manager 200 may be, for example, a module comprising a number of components or building blocks that define the parameters of the air interface 190 and collectively specify how a transmission is to be made and/or received by the air interface 190.

The components of the air interface manger 200 include at least one of a waveform component 205, a frame structure component 210, a multiple access scheme component 215, a protocol component 220, and a coding and modulation component 225.

The waveform component 205 may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

The frame structure component 210 may specify a configuration of a frame or group of frames. The frame structure component 210 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as sub-carrier spacing width, symbol duration, cyclic prefix (CP) length, channel bandwidth, guard bands/subcarriers, and sampling size and frequency.

Additionally, the frame structure component 210 may further specify whether the frame structure is used in a time-division duplex communication or a frequency-division duplex communication.

Together, the specifications of the waveform component and the frame structure component are sometimes known as the "numerology." Thus, the air interface 190 may include a numerology component 230 defining a number of air interface configuration parameters, such as the sub-carrier spacing, CP length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing maybe compatible with LTE or serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 215 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access, non-orthogonal multiple access, orthogonal multiple access, e.g., via a dedicated channel resource (i.e., no sharing between multiple EDs), contention-based shared channel resource, non-contention-based shared channel resource, and cognitive radio-based access.

The protocol component 220 may specify how a transmission and/or a re-transmission are to be made. Non-limiting examples of transmission and/or re-transmission mechanism options include those that specify a scheduled data pipe size and a signaling mechanism for transmission and/or re-transmission.

The coding and modulation component 225 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low Peak-to-Average Power Ratio (PAPR) modulation.

Because an air interface comprises a plurality of components or building blocks, and each component may have a plurality of candidate technologies (also referred to herein as air interface capability options), the air interface manager 200 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 200 and used for communications between the pair of communicating transmitting-receiving devices.

In further embodiments, the air interface manager 200 may modify or update its components, profiles, or capability options. For example, the air interface manager 200 may replace the waveform and frame structure components 205, 210, with a single numerology component 230. Conversely, the air interface manager 200 may separate the coding and modulation component 225 into an individual coding component and an individual modulation component. Furthermore, the air interface manager 200 is configurable such that new soft air interface configuration components developed in the future should be able to be utilized.

The air interface manager 200 may also update certain components to modify the capability options of any given component. For example, the air interface manager 200 may update the modulation and coding component 225 to include higher-order modulation schemes.

By updating the stored components, profiles, and candidate options, the air interface manager 200 can flexibly adapt to better accommodate diverse wireless traffic types and services. Modifying or updating components, profiles, and candidate options may allow the air interface manager 200 to provide suitable air interface profiles for traffic types or services other than those already contemplated for ultra-reliable low latency communications (URLLC), enhanced mobile broadband (eMBB), and massive machine-type communications (mMTC).

Figure 3A:
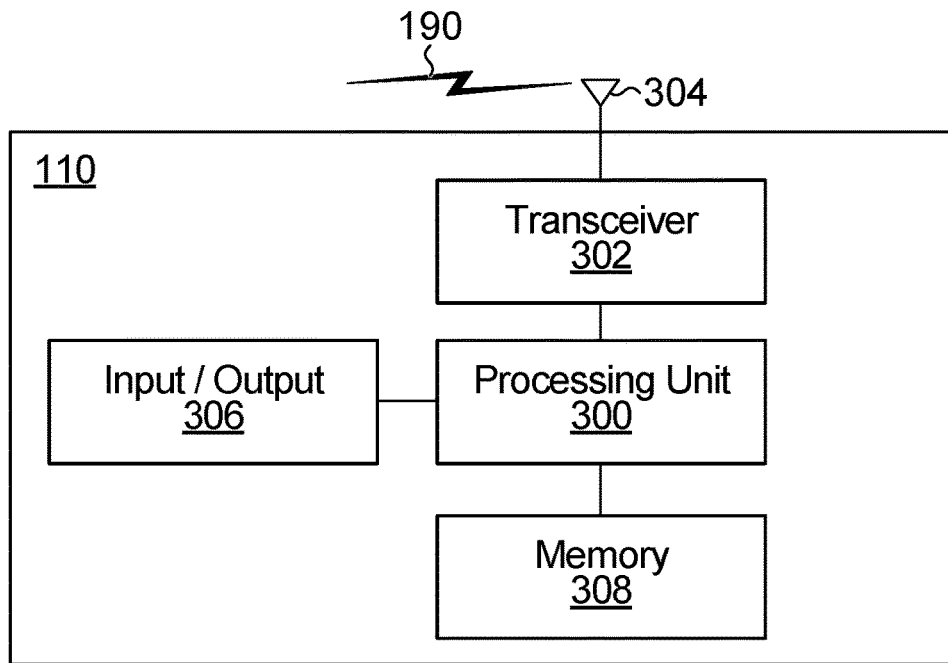
FIG. 3A is a block diagram of an example client side electronic device.
Figure 3B:
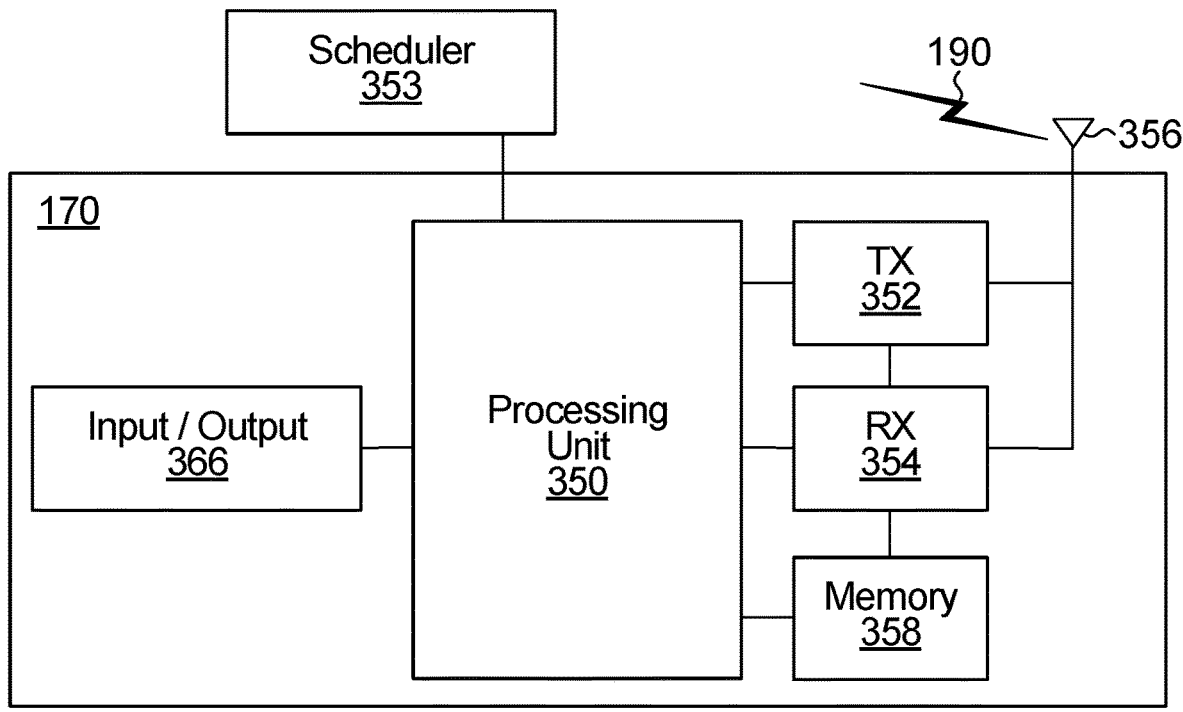
FIG. 3B is a block diagram of an example radio access network device.

FIGS. 3A and 3B illustrate example devices that may implement the methods and teachings according to this disclosure. In particular, FIG. 3A illustrates an example ED 110, and FIG. 3B illustrates an example base station 170. These components could be used in the communication system 100 or in any other suitable system.

As shown in FIG. 3A, the ED 110 includes at least one processing unit 300. The processing unit 300 implements various processing operations of the ED 110. For example, the processing unit 300 could perform signal coding, data processing, power control, input/output processing, or any other functionality enabling the ED 110 to operate in the communication system 100. The processing unit 300 may also be configured to implement some or all of the functionality and/or embodiments described in more detail above. Each processing unit 300 includes any suitable processing or computing device configured to perform one or more operations. Each processing unit 300 could, for example, include a microprocessor, microcontroller, digital signal processor, field programmable gate array, or application specific integrated circuit.

The ED 110 also includes at least one transceiver 302. The transceiver 302 is configured to modulate data or other content for transmission by at least one antenna 304 or Network Interface Controller (NIC). The transceiver 302 is also configured to demodulate data or other content received by the at least one antenna 304. Each transceiver 302 includes any suitable structure for generating signals for wireless or wired transmission and/or processing signals received wirelessly or by wire. Each antenna 304 includes any suitable structure for transmitting and/or receiving wireless or wired signals. One or multiple transceivers 302 could be used in the ED 110. One or multiple antennas 304 could be used in the ED 110. Although shown as a single functional unit, a transceiver 302 could also be implemented using at least one transmitter and at least one separate receiver.

The ED 110 further includes one or more input/output devices 306 or interfaces (such as a wired interface to the internet 150). The input/output devices 306 permit interaction with a user or other devices in the network. Each input/output device 306 includes any suitable structure for providing information to or receiving information from a user, such as a speaker, microphone, keypad, keyboard, display, or touch screen, including network interface communications.

In addition, the ED 110 includes at least one memory 308. The memory 308 stores instructions and data used, generated, or collected by the ED 110. For example, the memory 308 could store software instructions or modules configured to implement some or all of the functionality and/or embodiments described above and that are executed by the processing unit(s) 300. Each memory 308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 350, at least one transmitter (TX) 352, at least one receiver (RX) 354, one or more antennas 356, at least one memory 358, and one or more input/output devices or interfaces 366. A transceiver, not shown, may be used instead of the transmitter 352 and receiver 354. A scheduler 353 may be coupled to the processing unit 350. The scheduler 353 may be included within or operated separately from the base station 170. The processing unit 350 implements various processing operations of the base station 170, such as signal coding, data processing, power control, input/output processing, or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, microcontroller, digital signal processor, field programmable gate array, or application specific integrated circuit.

Each transmitter 352 includes any suitable structure for generating signals for wireless or wired transmission to one or more EDs or other devices. Each receiver 354 includes any suitable structure for processing signals received wirelessly or by wire from one or more EDs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the ED 110. The memory 358 stores instructions and data used, generated, or collected by the base station 170. For example, the memory 358 could store software instructions or modules configured to implement some or all of the functionality and/or embodiments described above and that are executed by the processing unit(s) 350.

Each input/output device 366 permits interaction with a user or other devices in the network. Each input/output device 366 includes any suitable structure for providing information to or receiving/providing information from a user, including network interface communications.

Embodiments that may be implemented on one or more of the devices illustrated in FIGS. 1, 2, 3A and 3B will now be described in detail. The following embodiments enable wireless communication using multiple simultaneously active BWPs.

Some aspects of the present disclosure pertain to grouping of bandwidth parts (BWPs) within a carrier of serving cell. A BWP group (BWG) consists of a particular number (K) of configured BWPs within the carrier or serving cell. The value of K can be either fixed or configurable. Examples of K may be 1, 2, 4 and 8. These examples do not preclude the value of K from being some other value. In some embodiments, all of the BWGs of a carrier can consist of the same number K of BWPs. In some embodiments, the number K of BWPs can be different for at least two BWGs in the same carrier.

Within each BWG, only a single BWP is active at a given time. By enabling multiple BWGs to be active, multiple BWPs may also be activated. Associating multiple BWPs to a BWG has certain advantages, such as enabling multiple active BWPs while minimizing a necessity for new control signaling. In other words, grouping BWPs into BWGs allows for some (or all) reuse of BWP-specific control signaling when multiple BWPs are active.

In some embodiments, more than one BWP group is configured for a UE. For example, more than one BWP group is configured for use over a Uu interface between a base station and the UE. In some embodiments, more than one BWP group is configured for sidelink connection between UEs. The sidelink connection between UEs may be of used in situations such as, but not limited to, vehicle-to-vehicle (V2V) communications. In some embodiments of multiple BWGs being configured, at least one BWP group is configured for the Uu interface between the base station and the UE and at least one BWP group is configured for a sidelink connection between UEs.

In some embodiments of the application, where there are multiple BWGs in a carrier, it is possible to configure one BWG a primary BWG (P-BWG) and other BWGs in the carrier as secondary BWGs (S-BWGs). Up to N S-BWGs are configured in a carrier or serving cell. In some embodiments N is fixed. In some embodiments N is configurable. Examples of N may be 0, 1, 3 and 7. These examples do not preclude the value of from being some other value. The P-BWG may always have ID 0. S-BWGs when configured for the carrier are given ID 1 to ID N.

In an example where one BWG is a P-BWG, the P-BWG is always considered to be active and one or more S-BWGs can be activated or deactivated.

A BWG is associated with control signals. The control signals include information about where the UE is to monitor for data and other control signals. The information describing where the UE is to monitor for data or other control signals includes information for scheduling the data and other control signals within the same BWP or a different BWP in the same BWG or for switching to monitoring for data or other control signals in a BWP of a different BWG, for example one of the S-BWG.

A BWP within a P-BWG can be scheduled only from BWPs within the P-BWG. With regard to the S-BWGs, in some embodiments, a BWP can be scheduled from BWPs within the P-BWG or a BWP in the same S-BWG. In other embodiments, the BWP is scheduled only from BWPs in the same S-BWG.

In another aspect of the present application, methods are provided for activating or deactivating the S-BWG. In some embodiments, the activating and deactivating can be performed using higher-layer signaling. In some embodiments, the activating and deactivating can be performed using a media access control (MAC) control element (CE). In some embodiments, the activating and deactivating can be performed using downlink control information (DCI). When using DCI, a UE-specific DCI can be used to activate/deactivate the S-BWG. Alternatively, a group-common DCI can be used to activate/deactivate the S-BWG. It is to be understood that a DCI format can be used specifically for the activation/deactivation purpose, or an existing DCI format can be reinterpreted for activation/deactivation of the S-BWG.

The S-BWG activation/deactivation can be performed using an explicit activation/deactivation or implicitly. Explicit activation/deactivation can involve using any of the options described above, i.e. higher-layer signaling, MAC-CE, or DCI.

Implicit activation/deactivation can involve using any of the options described above, and the S-BWG is activated/deactivated implicitly by activation/deactivation of a BWP in the S-BWG. Therefore, when the BWP in an S-BWG is activated or deactivated, the entire S-BWG is activated or deactivated, if that is a UE behavior or rule.

Another aspect of the present application is defining associations between BWPs and BWGs and indicating the associations to UEs. In a first embodiment, the UE obtains an indication that particular BWPs belong to a particular BWG. In a second embodiment, the UE obtains an indication of the BWG that is associated with a configured BWP.

With regard to the first embodiment, the UE may be notified of the BWG size in terms of K BWPs. For the BWG, the UE can be notified of the identifiers of the K BWPs (BWP IDs) that are associated with the BWG. These two notifications can occur in a single notification or a combined notification. Another manner of notifying the UE of the BWPs in the BWG may include using a bitmap, the size of which is equal to a maximum number of configured BWPs in the carrier or serving cell. For example, for a carrier having a maximum of 8 configured BWPs and BWPs 1, 3, 4 and 8 are being used in the BWG, the bitmap may have the appearance "10110001", where the "1 s" indicate BWPs 1, 3, 4 and 8 belong to the BWG.

With regard to the second embodiment, in one manner of providing the UE the information, the UE is notified of, for each configured BWP, the BWG ID of the BWG the BWP belongs to. In another manner of providing the UE the information, the UE is notified of, for each configured BWP, the number (M) of BWGs the BWP belongs to, for example M=1, 2, 4 and 8 and then the M BWG IDs of the BWGs that the BWP belongs to. In another manner of providing the UE the information, the UE is notified of, for each configured BWP, a bitmap of size N1 to indicate the BWGs it belongs to. For example, for a carrier having a maximum of 8 BWGs and a BWP is used in BWGs 1, 3, 4 and 8, the bitmap may have the appearance "10110001", where the "1 s" indication BWGs 1, 3, 4 and 8 that are using the BWP. In some embodiments, N1 can be the total number of BWGs that the BWP belongs to. In some embodiments, N1 can be the number of S-BWGs that the BWP belongs to. In such a case, it would be understood that the BWP also belongs to the P-BWG.

In some embodiments, the UE may also be notified of an association of a default BWP to a BWG or an initial active BWP to a BWG. The initial active BWP may be the BWP first monitored by the UE when accessing the network or during handoff between cells. The size and or location of the initial BWP may be used for several other purposes, for example, to determine the DCI size for some DCI formats or to define the location of the control resource set (CORESET) having CORESET ID #0. The initial active BWP may only exist in the P-BWG or may exist on all BWGs. The default BWP may be the BWP that is activated automatically after a BWP-switching timer is expired, if such a timer is configured for use by the UE. The timer has a start/restart condition and expires if the start/restart condition is not met for a certain configured duration. In some embodiments, the UE may be advised of an association of a "first active BWP" to a BWG. The first active BWP of a BWG is the BWP which is activated once the BWG is activated.

Another aspect of the present disclosure is the configuration of BWP-related higher-layer parameters. In some embodiments, the higher layer parameters are BWG-specific. This may be particularly useful with respect to configuring higher layer parameters for the S-BWG. In some embodiments, the higher layer parameters are BWP-specific.

One or more of the following parameters can be configured on a per BWG basis: Control Resource Set (CORESET) configuration, Search space set configuration physical downlink shared channel (PDSCH) configuration; physical uplink shared channel (PUSCH) configuration; channel quality indication (CQI) table; and the target block error rate (BLER) for CQI feedback.

Configuring of BWG-specific parameters can occur in multiple different ways. In some embodiments, BWG-specific higher-layer parameters are configured on a per BWG basis.

In some embodiments, each BWG includes a primary or first BWP. The BWG-specific higher-layer parameters are configured for the primary or first BWP of each BWG. The higher layer parameters can then be applied to the other BWPs in the BWG. This may be an explicit configuration of the primary/first BWP and secondary or other BWPs or an explicit configuration of the primary/first BWP and the configuration of the secondary or other BWPs is implicit, if such an implicit configuration is a UE specific behavior or rule for the UE.

Several examples will now be described in relation to functionalities of BWPs within BWGs or across BWGs, or both.

Figure 4:
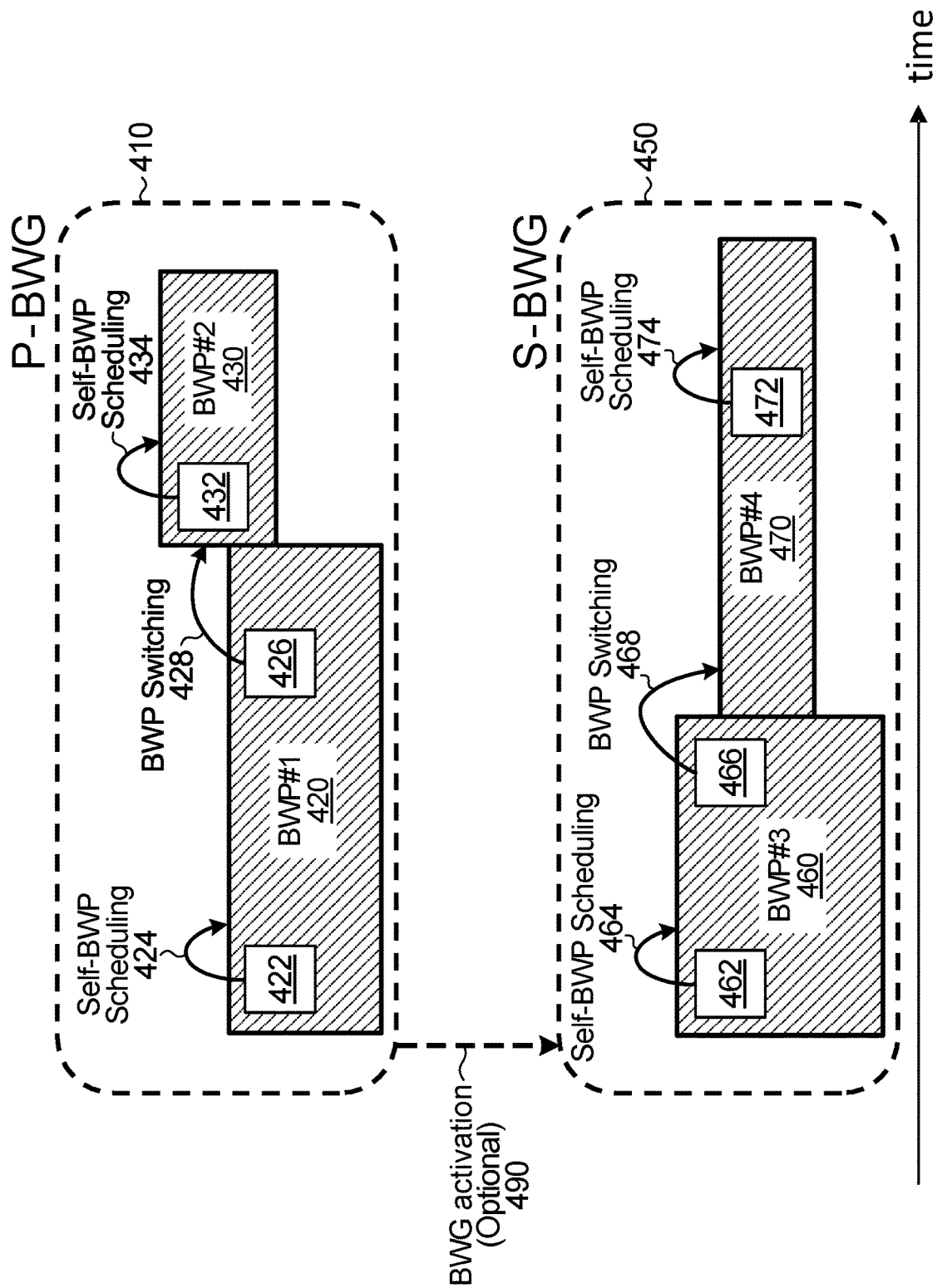
FIG. 4 is a block diagram illustrating a first example of two bandwidth part groups (BWGS) each including plurality of bandwidth parts (BWPs) used for providing a user equipment (UE) with control signals and data according to an aspect of the present application.

In a first example, there is a first or primary BWG and one or more second or secondary BWGs. Each BWP in either the first/primary BWG and the one or more second/secondary BWG has a CORESET with control information that includes information for notifying the UE where to monitor for data and additional control signals. In FIG. 4 and the other examples described below there are multiple occurrences of CORESET information in the BWP that can be monitored by the UE for providing information regarding scheduling and switching of control signals and data for the UE.

Notification of scheduling information for the same BWP or switching information for a different BWP in the same BWG occurs only within the same BWG. BWP scheduling and switching of BWPs in a BWG is done using only normal BWP scheduling and switching commands transmitted in a BWP of the BWG. Activation of the one or more second or secondary BWG is performed by the first or primary BWG.

FIG. 4 illustrates a schematic diagram of two BWGs, a primary BWG (P-BWG) 410 and a secondary BWG (S-BWG) 450. Primary BWG 410 includes two BWPs, BWP #1 420 and BWG #2 430. Control signals 422 in BWP #1 420 can be used for self-BWP scheduling 424, i.e. information to notify the UE where there is data or additional control signals for the UE in the BWP. Control signals 426 in BWP #1 420 can also be used for BWP switching 428, i.e. information to notify the UE where there is data or additional control signals for the UE in a different BWP in the BWG. The BWP switching 428 notifies the UE to monitor for control signals or data, or both, in BWP #2 430. Control signals 432 in BWP #2 430 can be used for self-BWP scheduling 434.

Secondary BWG 450 includes two BWPs, BWP #3 460 and BWG #4 470. Control signals 462 in BWP #3 460 can be used for self-BWP scheduling 464. Control signals 466 in BWP #3 460 can also be used for BWP switching 468. The BWP switching 468 notifies the UE to monitor for control signals or data, or both, in BWP #4 470. Control signals 472 in BWP #4 470 can be used for self-BWP scheduling 474.

In some embodiments, the primary BWG can activate the secondary BWG using a BWG activation signal 490. In some embodiments, the secondary BWG is activated once it is configured, and so, BWG activation is not signaled to the UE.

The control signals are generally considered to be included in a CORESET being monitored by the UE.

In a second example, there is a first or primary BWG and one or more second or secondary BWGs. Each BWP in the first or primary BWG has a CORESET with control information that includes information for notifying the UE where to monitor for data and additional control signals. The one or more second or secondary BWG does not include a CORESET.

Notification of scheduling information for the same BWP in the primary BWG or switching information for a different BWP in the primary BWG only is provided in the primary BWG. BWP scheduling and switching of BWPs in the primary BWG can be done using normal BWP scheduling and switching commands transmitted in a BWP of the primary BWG.

Cross-BWG scheduling can be performed when a notification is transmitted to the UE in a BWP of the primary BWG to schedule data in a BWP which is already active in a secondary BWG. One BWP in the secondary BWG is considered to be activated at a given time, without deactivating or switching the active BWP of the primary BWG.

Cross-BWG BWP switching can be performed when a notification is transmitted to the UE in a BWP of the primary BWG to schedule data in a new BWP in a secondary BWG. The may involve activating a new BWP at an earlier time without scheduling data at that time. In some embodiments, a BWP switching delay may be used.

Figure 5:
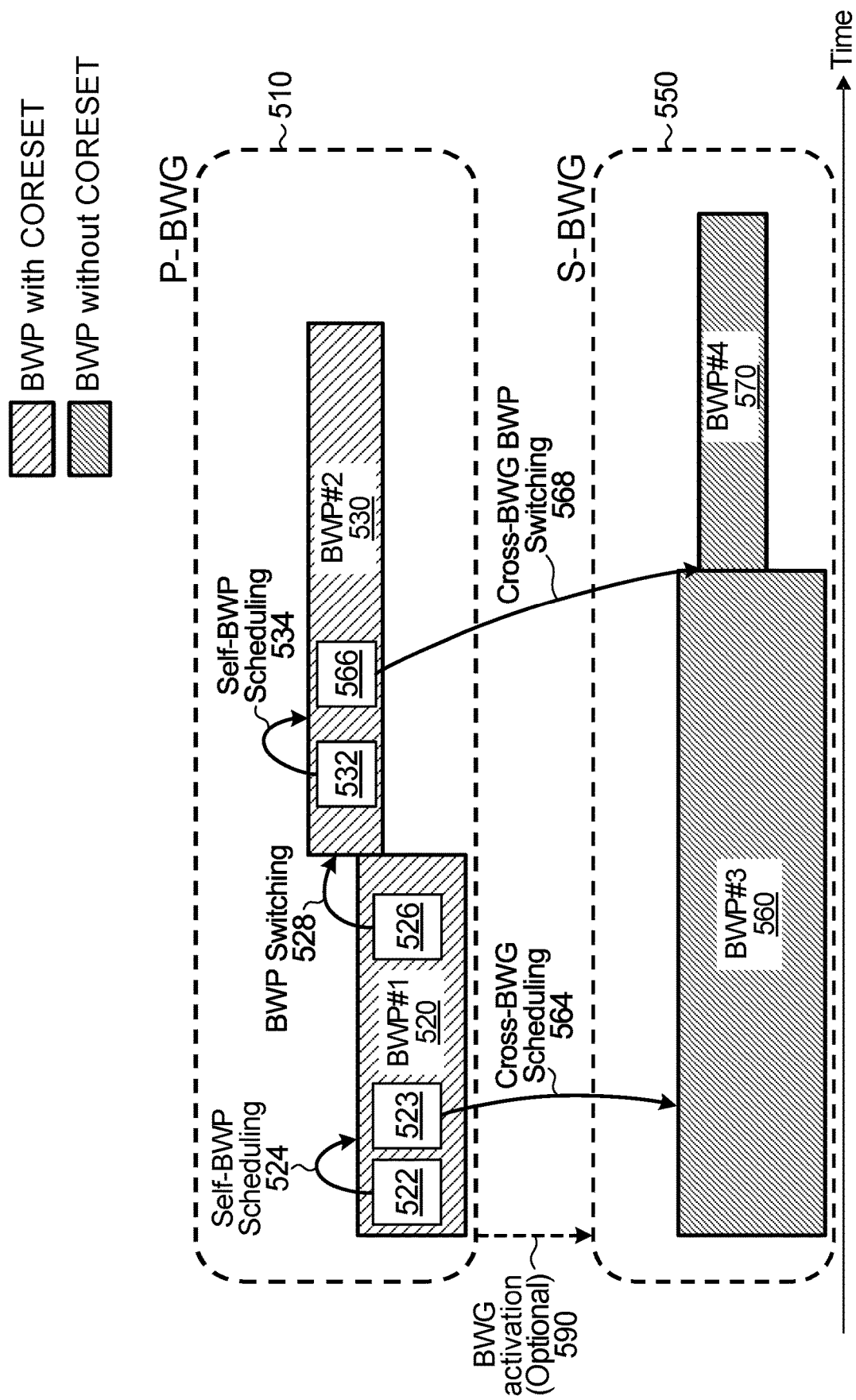
FIG. 5 is a block diagram illustrating a second example of two BWGs each including plurality of BWPs used for providing a UE with control signals and data according to an aspect of the present application.

FIG. 5 illustrates a schematic diagram of two BWGs, a primary BWG (P-BWG) 510 and a secondary BWG (S-BWG) 550. Primary BWG 510 includes two BWPs, BWP #1 520 and BWG #2 530. Control signals 522 in BWP #1 520 can be used for self-BWP scheduling 524. Control signals 526 in BWP #1 520 can also be used for BWP switching 528. The BWP switching 528 notifies the UE to monitor for control signals or data, or both, in BWP #2 530. Control signals 532 in BWP #2 530 can be used for self-BWP scheduling 534.

Secondary BWG 550 includes two BWPs, BWP #3 560 and BWG #4 570. Control signals 523 in BWP #1 520 can be used for cross-BWG scheduling 564. The cross-BWG scheduling 564 notifies the UE of a scheduling of control signals or data, in BWP #3 560. Control signals 566 in BWP #2 530 can also be used for cross-BWG BWP switching 568. The cross-BWG BWP switching 568 notifies the UE to monitor for control signals or data, or both, in BWP #4 570.

In some embodiments, the primary BWG can activate the secondary BWG using a BWG activation signal 590. In some embodiments, the secondary BWG is activated once it is configured, and so, BWG activation is not signaled to the UE.

In a third example, there is a first or primary BWG and one or more second or secondary BWGs. Each BWP in either the first/primary BWG and the one or more second/secondary BWG has a CORESET with control information that includes information for notifying the UE where to monitor for data and additional control signals.

Notification of scheduling information for the same BWP or switching information for a different BWP in the same BWG can occur within the same BWG. BWP switching and scheduling of BWPs in the secondary BWG can also be done using a command transmitted in a BWP in the primary BWG. The command can be enabled/disabled by higher-layer configuration. BWP scheduling and switching of BWPs in the first/primary BWG is done using only normal BWP scheduling and switching commands transmitted in a BWP of the first/primary BWG. In some embodiments, activation of the one or more second or secondary BWG is performed by the first or primary BWG. In some embodiments, the secondary BWG is activated once it is configured, and so, BWG activation is not signaled to the UE.

Figure 6:
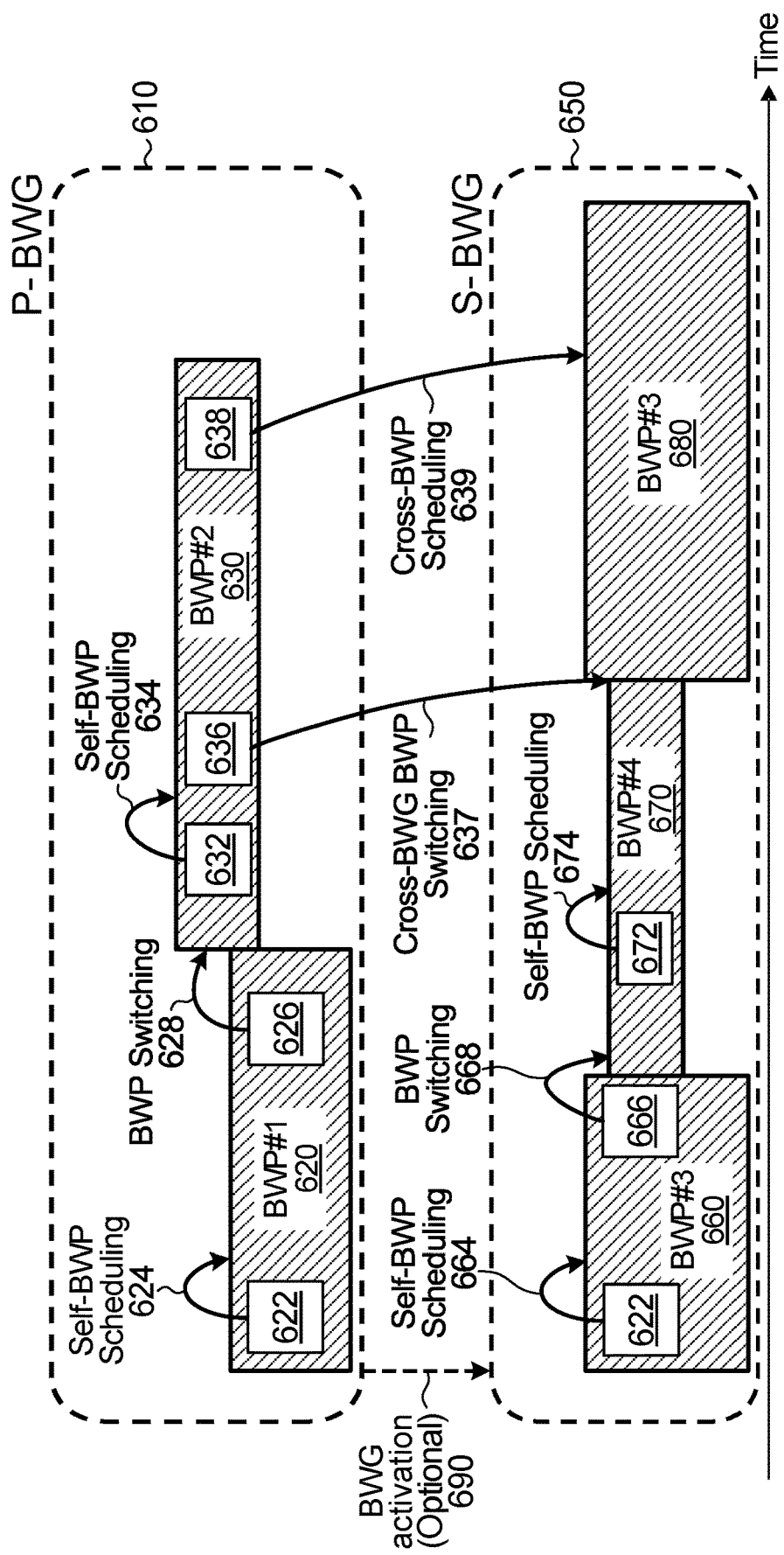
FIG. 6 is a block diagram illustrating a third example of two BWGs each including plurality of BWPs used for providing a UE with control signals and data according to an aspect of the present application.

FIG. 6 illustrates a schematic diagram of two BWGs, a primary BWG (P-BWG) 610 and a secondary BWG (S-BWG) 650. Primary BWG 610 includes two BWPs, BWP #1 620 and BWG #2 630. Control signals 622 in BWP #1 620 can be used for self-BWP scheduling 624. Control signals 626 in BWP #1 620 can also be used for BWP switching 628. The BWP switching 628 notifies the UE to monitor for control signals or data, or both, in BWP #2 630. Control signals 632 in BWP #2 630 can be used for self-BWP scheduling 634.

Secondary BWG 650 includes two BWPs, BWP #3 660 and 680 and BWG #4 670. BWP #3 includes two portions 660 and 680 that are separated by BWP #670. This amounts to BWP #3 660 being active, switching to BWP #4 670 and then switching back to BWP #3 680. Control signals 662 in BWP #3 660 can be used for self-BWP scheduling 664. Control signals 666 in BWP #3 660 can also be used for BWP switching 668. The BWP switching 668 notifies the UE to monitor for control signals or data, or both, in BWP #4 670. Control signals 672 in BWP #4 670 can be used for self-BWP scheduling 674.

Control signals 636 in BWP #2 630 can be used for cross-BWG BWP switching 637. The cross-BWG BWP switching 637 notifies the UE to monitor for control signals or data, or both, in BWP #3 680. Control signals 638 in BWP #2 630 can also be used for cross-BWP scheduling 639. The cross-BWP scheduling 639 notifies the UE of a scheduling of control signals, or data, or both, in BWP #3 680.

In some embodiments, the primary BWG can activate the secondary BWG using a BWG activation signal 690. In other embodiments, the secondary BWG is activated once it is configured, and so, BWG activation is not signaled to the UE.

In a fourth example, one active BWP is considered to be a primary BWP at a particular time and other BWPs can be made the primary BWP at other times using a BWP switching DCI. Each BWP has a CORESET with control information that includes information for notifying the UE where to monitor for data and additional control signals. At the particular time, the UE performs physical downlink channel (PDCCH) monitoring on the CORESET (adaptive CORESET monitoring). In the fourth example, it may not be necessary to group multiple BWPs into one or more BWGs. The fourth example may include additional commands or control signaling to enable multiple active BWPs without necessitating BWGs.

There are several additional notifications that the UE may receive for implementation of this fourth example. In some embodiments, a BWP activation notification may be used to notify the UE in the primary BWP that another BWP is activated without deactivating the primary BWP. This notification may or may not schedule data in the newly activated BWP. This notification may have a switching implication if another BWP, other than primary BWP, is already active and the number of active BWPs has already reached a threshold number of allowed simultaneously active BWPs. Therefore, the notification may also notify the UE if BWP switching occurs from a previously activated BWP to the newly activated BWP. A BWP "activation" delay or BWP "switching" delay may be needed accordingly.

In some embodiments, a cross-BWP scheduling notification is used to notify the UE in the primary BWP of scheduling of data in a BWP that is already active, without having to deactivate the primary BWP.

In some embodiments, a fast BWP switching notification is used to notify the UE in the primary BWP to switch the primary BWP to another BWP which is already active. This notification may also result in deactivating the current primary BWP. Since the new primary BWP is already active, no BWP switching delay is required.

In some embodiments, a BWP deactivation notification is used to notify the UE in the primary BWP to deactivate another BWP.

Several different alternatives are contemplated for deactivating an active BWP. In some embodiments, the deactivation may be in the form of the UE receiving a notification in the form of a DCI, a MAC CE or RRC signaling. In some embodiments, the deactivation could occur as a result of a BWP deactivation timer, if such a timer is configured to the UE by higher-layer signaling. In such a case, the maximum timer duration and timer increment/decrement step are configured to the UE. Once a deactivation timer expires the BWP will be deactivated. In some embodiments, the deactivation could occur as a result an implicit BWP deactivation using behavior or rules that have been configured in the UE.

An example of a behavior or rule is that at most X BWPs can be active at a given time for a UE. The UE autonomously deactivates a non-primary BWP with a lowest BWP ID or a highest BWP ID (or any other BWP which is selected using any other predefined rule), if the number of active BWPs exceeds X.

Figure 7:
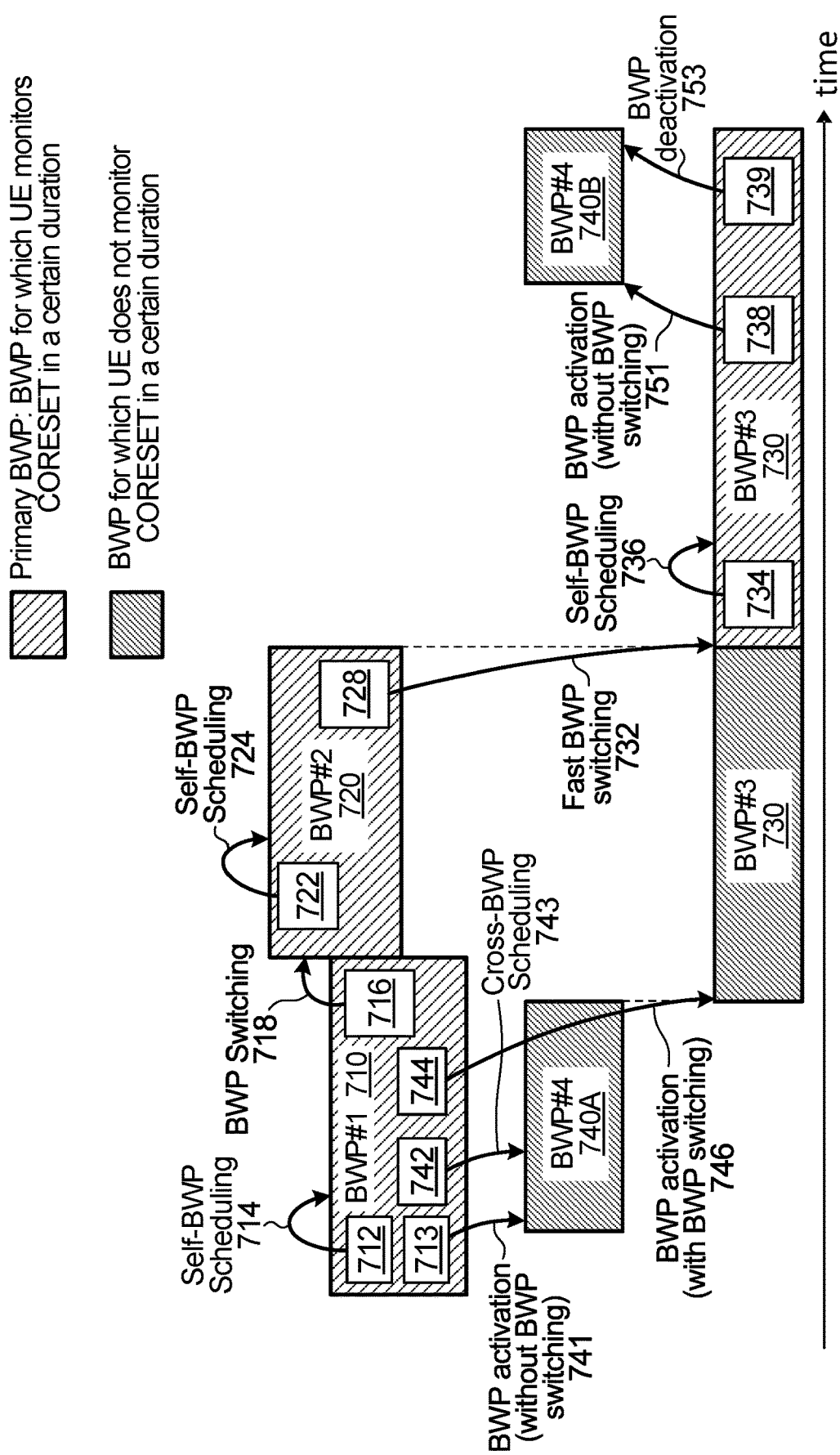
FIG. 7 is a block diagram illustrating an example of a plurality of BWPs, where one of the BWPs is a primary BWP at a given time, the plurality of BWPs used for providing a UE with control signals and data according to an aspect of the present application.

FIG. 7 illustrates a schematic diagram of four BWPs, BWP #1 710, BWP #2 720, BWP #3 730 and BWP #4 740A and 740B. BWP #1 710 may be considered a primary BWP. Control signals 712 in BWP #1 710 can be used for self-BWP scheduling 714. Control signals 716 in BWP #1 710 can also be used for BWP switching 718. The BWP switching 718 notifies the UE to monitor for control signals or data, or both, in BWP #2 720. Control signals 722 in BWP #2 720 can be used for self-BWP scheduling 724.

Control signals 713 in BWP #1 710 can be used for BWP activation 741 without BWP switching. The BWP activation 741 activates BWP #4 740A but there is no need to notify the UE of scheduling in BWP #4 740A or switching to BWP #4 740A as only the CORESET, which includes the control signals, of a single BWP is being monitored by the UE at a given time and initially in the example of FIG. 7 BWP #1 710 is the primary BWP being monitored by the UE. Control signals 742 in BWP #1 710 can also be used for cross-BWP scheduling 743. The cross-BWP scheduling 743 notifies the UE of a scheduling of control signals or data, or both, from BWP #1 710 to BWP #4 740A. Control signals 744 in BWP #1 710 can also be used for BWP activation 746 with BWP switching. The BWP activation 746 activates BWP #3 730 and notifies the UE to monitor for control signals or data, or both, in BWP #3 730, and deactivates BWP #4 740A.

Control signals 728 in BWP #2 720 can also be used for fast BWP switching 732. The fast BWP switching 732 notifies the UE that BWP #3 730, which was previously activated, is now the primary BWP and the UE can monitor a CORESET, which includes the control signals, in BWP #3 730 for control signals or data, or both. Control signals 734 in BWP #3 730 can be used for self-BWP scheduling 736. Control signals 738 in BWP #3 730 can be used for BWP activation 751 without BWP switching. The BWP activation 751 activates BWP #4 740B but there is no need to notify the UE of scheduling in BWP #4 740B or switching to BWP #4 740B. Control signals 739 in BWP #3 730 can be used for BWP de-activation 753. Deactivation can be performed by any of the manners described above.

Figure 8:
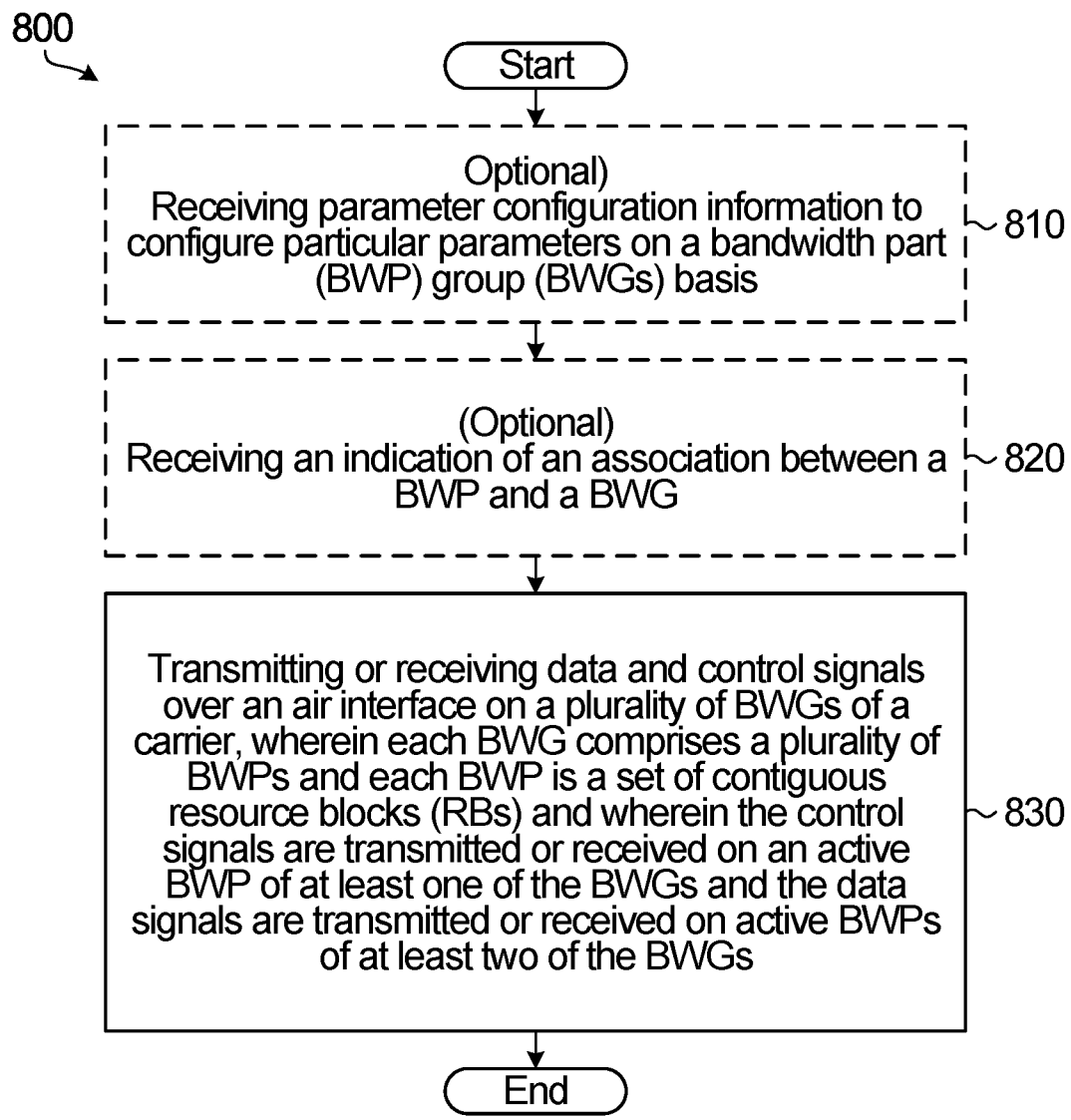
FIG. 8 is a flow chart describing a method according to an embodiment of the application.

FIG. 8 includes a flow chart 800 that describes a method according to an aspect of the present application. An optional step 810 in the method involves receiving parameter configuration information to configure particular parameters on a BWG basis. Examples of the particular parameters include at least one of: control resource set (CORESET) configuration parameters; search space set configuration parameters; physical downlink shared channel (PDSCH) configuration parameters; physical uplink shared channel (PUSCH) configuration parameters; channel quality indicator (CQI) table configuration parameters; target block error rate (BLER) configuration parameters for CQI feedback; and modulation and code scheme table configuration parameters.

Another optional step 820 involves receiving an indication of an association between a BWP and a BWG. Receiving the indication of the association between the BWP and the BWG involves receiving an indication of the BWPs that a BWG is associated with or receiving an indication of the BWGs that the BWP is associated with. In some embodiments, receiving an indication of the BWGs that a BWP is associated with involves, for each BWP, receiving a BWG identifier (ID) that the BWP is associated with. In some embodiments, receiving an indication of the BWGs that a BWP is associated with involves, for each BWP, receiving an indication of a number of BWGs that the BWP is associated with and the BWG ID for each of the BWGs that the BWP is associated with. In some embodiments, receiving an indication of the BWGs that a BWP is associated with involves, for each BWP, receiving a bitmap having a number of bits equal to a number of configured BWGs in the carrier and wherein the BWGs associated with the BWP are indicated in the bitmap.

In some embodiments, receiving the indication of the BWPs that a BWG is associated with involves receiving an indication of a number of BWPs associated with the BWG and BWP identifiers (IDs) for each of the BWPs associated with the BWG. In some embodiments, receiving the indication of the BWPs that a BWG is associated with involves receiving a bitmap having a number of bits equal to a number of configured BWPs of the carrier and wherein the BWPs associated with the BWG are indicated in the bitmap.

Step 830 involves transmitting or receiving data and control signals over an air interface on a plurality of BWGs of a carrier. Each BWG comprises a plurality of BWPs and each BWP is a set of contiguous resource blocks (RBs). The control signals are transmitted or received on an active BWP of at least one of the BWGs and the data signals are transmitted or received on active BWPs of at least two of the BWGs. In some embodiments, the method is performed by a radio access network device, such as a base station, in which the radio access network device is transmitting control signals and data to a UE on the plurality of BWGs of the carrier or receiving data from the UE on the plurality of BWGs of the carrier. In some embodiments, the method is performed by a UE in which the UE is receiving control signals and data from the radio access network device on the plurality of BWGs of the carrier or transmitting data to the radio access network device on the plurality of BWGs of the carrier.

In some embodiments, at most one BWP in each BWG of the plurality of BWGs is active at a time for transmitting or receiving.

In some embodiments, in particular with reference to the method being performed by a UE receiving the plurality of BWGs of the carrier, the method further involves receiving an indication of a number of BWGs configured in the carrier.

In some embodiments, the plurality of BWGs includes at least a first BWG and a second BWG, and the control signals include signals for scheduling data in a first active BWP in the first BWG. Examples of this are shown in FIGS. 4, 5 and 6 in which the primary BWGs are identified by reference characters 410, 510 and 610 and the secondary BWGs are identified by reference characters 450, 550 and 650. Examples of signals for scheduling data in a first active BWP in the first BWG are shown in FIGS. 4, 5 and 6 in which signals for switching are identified by reference characters 424, 434, 524, 534, 624 and 634.

In some embodiments, the control signals further include signals for switching from the first active BWP in the first BWG to a second active BWP in the first BWG. Examples of this are shown in FIGS. 4, 5 and 6 in which signals for switching are identified by reference characters 428, 528 and 628. In some embodiments, switching from the first active BWP in the first BWG to the second active BWP in the first BWG involves deactivating the first active BWP in the first BWG and activating the second active BWP in the first BWG.

In some embodiments, the control signals further include signals for scheduling data in a first active BWP in the second BWG. Examples of this are shown in FIGS. 4, 5 and 6 in which signals for scheduling are identified by reference characters 464, 474, 564, 664 and 674.

In some embodiments, the control signals further include signals for switching from the first active BWP in the second BWG to a second active BWP in the second BWG. Examples of this are shown in FIGS. 4, 5 and 6 in which signals for switching are identified by reference characters 468, 568 and 668. In some embodiments, switching from the first active BWP in the second BWG to the second active BWP in the second BWG comprises deactivating the first active BWP in the second BWG and activating the second active BWP in the second BWG.

In some embodiments, the control signals are received in the first active BWP in the first BWG.

In some embodiments, only BWPs in the first BWG include a control resource set (CORESET). An example of this is shown in FIG. 5 where there are no CORESETs in the secondary BWG BWPs.

In some embodiments, the control signals are received in the first active BWP in the second BWG.

In some embodiments, one BWP in a BWG is designated a primary BWP.

The method may then further involve receiving parameter configuration information used to configure the UE for receiving data and control signals in the primary BWP of the BWG and utilizing the parameter configuration information for the primary BWP when configuring for receiving data and control signals in remaining BWPs in the BWG.

In some embodiments, the second BWG is activated or deactivated by receiving higher-layer signaling. In some embodiments, the second BWG is activated or deactivated by receiving a media access control (MAC) control element (CE). In some embodiments, the second BWG is activated or deactivated by receiving downlink control information (DCI). Receiving the DCI to activate the second BWG may include receiving either a UE specific DCI or a group common DCI. In some embodiments, the second BWG is activated once it is configured, and so, BWG activation is not signaled to the UE.

In some embodiments, activating the second BWG is performed by receiving an activation signal for at least one BWP of the second BWG. Examples of this are shown in FIGS. 4, 5 and 6 in which receiving an activation signal for at least one BWP of the second BWG can be seen as reference characters 490, 590 and 690.

In some embodiments, the method further involves receiving an identification of a default BWP in a BWG.

In some embodiments, the method further involves receiving an identification of a first active BWP in a BWG.

Figure 9:
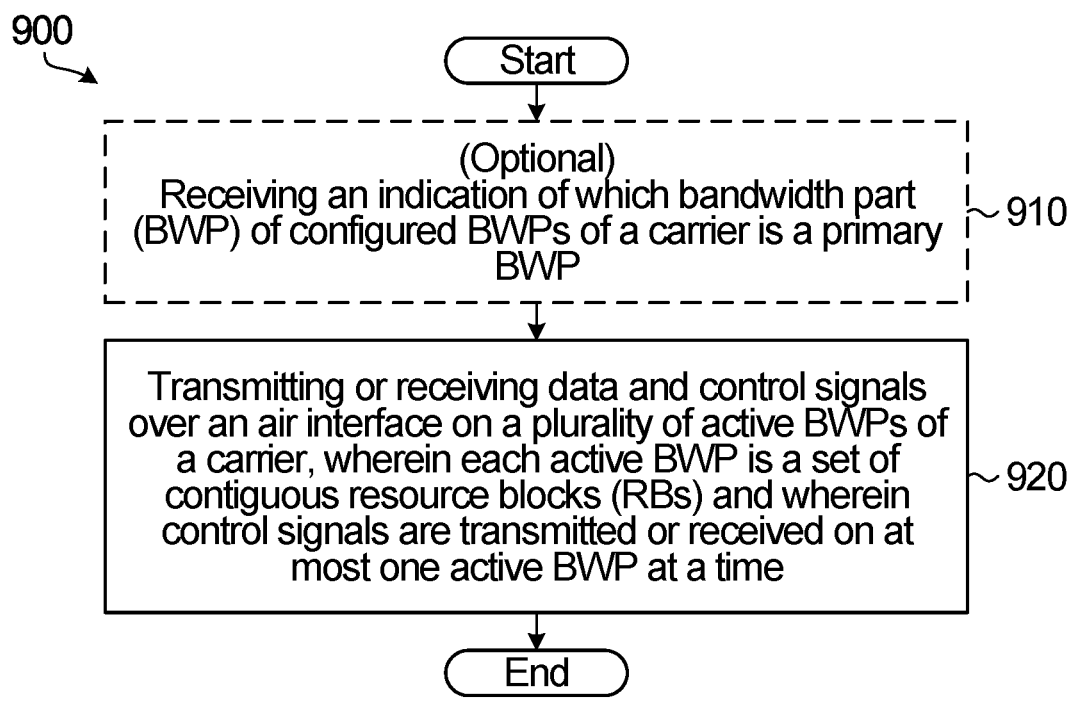
FIG. 9 is a flow chart describing another method according to an embodiment of the application.

FIG. 9 includes a flow chart 900 that describes a method according to an aspect of the present application. An optional step 910 in the method involves receiving an indication of which BWP of the configured BWPs is a primary BWP. An example of this is shown in FIG. 7 in which a primary BWP is initially identified by BWP #1 710 and at a subsequent time changes to BWP #2 720 and at still a later time changes to BWP #3 730. Step 920 involves transmitting or receiving data and control signals over an air interface on a plurality of active BWPs of a carrier, wherein each active BWP is a set of contiguous resource blocks (RBs). Control signals are transmitted or received on at most one active BWP at a time. In some embodiments, the method is performed by a radio access network device, such as a base station, in which the radio access network device is transmitting control signals and data to a UE on the plurality of BWPs of the carrier or receiving data from the UE on the plurality of BWPs of the carrier. In some embodiments, the method is performed by a UE in which the UE is receiving control signals and data from the radio access network device on the plurality of BWPs of the carrier or transmitting data to the radio access network device on the plurality of BWPs of the carrier.

In some embodiments, the control signals include signals for scheduling data in the first active BWP. Examples of this are shown in FIG. 7 in which the signal for scheduling is identified by reference characters 714, 724 or 736.

In some embodiments, the control signals are transmitted or received on a first active BWP for scheduling data in a second active BWP without deactivating the first active BWP. An example of this is shown in FIG. 7 in which the signal for switching is identified by reference character 743.

In some embodiments, the control signals are transmitted or received on a first active BWP for activating a second active BWP without deactivating the first active BWP. Examples of this are shown in FIG. 7 as identified by reference characters 741 and 751.

In some embodiments, the control signals are transmitted or received on a first active BWP for activating a third active BWP and deactivating the second active BWP. An example of this is shown in FIG. 7 as identified by reference character 746.

In some embodiments, the first active BWP described above is a primary BWP.

In some embodiments, the control signals are transmitted or received on a first active BWP for switching the primary BWP from the first active BWP to the second active BWP. An example of this is shown in FIG. 7 as identified by reference character 718.

In some embodiments, switching the primary BWP from the first active BWP to the second active BWP further comprises switching to the second active BWP which is already activated. An example of this is shown in FIG. 7 as identified by reference character 732.

In some embodiments, the control signals are transmitted or received on a first active BWP for deactivating a second active BWP. An example of this is shown in FIG. 7 as identified by reference character 753.

In some embodiments, the control signals for deactivating the second active BWP are one of: higher layer signaling, media access control (MAC) control element (CE), or downlink control information (DCI).

In some embodiments, a first active BWP is deactivated by a BWP deactivation timer or is deactivated implicitly. The first active BWP may be deactivated implicitly when the number of active BWPs exceeds a threshold.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
transmitting or receiving, by an apparatus, data signals and control signals over an air interface on a plurality of bandwidth part (BWP) groups (BWGs) of a carrier, wherein each BWG comprises a plurality of BWPs and each BWP is a set of contiguous resource blocks (RBs), the control signals transmitted or received on an active BWP of at least one of the BWGs, and the data signals transmitted or received on active BWPs of at least two of the BWGs,
wherein the plurality of BWGs comprises at least a first BWG and a second BWG, and the control signals include signals for scheduling data in a first active BWP in the first BWG,
wherein the control signals further include signals for scheduling data in a first active BWP in the second BWG, and
wherein only BWPs in the first BWG include a control resource set (CORESET), and the signals for scheduling the data in the first active BWP in the second BWG are received in the first active BWP in the first BWG.

2. The method of claim 1, wherein at most one BWP in each BWG of the plurality of BWGs is active at a time for transmitting or receiving.

3. The method of claim 1, wherein the control signals further include signals for switching from the first active BWP in the first BWG to a second active BWP in the first BWG.

4. The method of claim 3, wherein switching from the first active BWP in the first BWG to the second active BWP in the first BWG comprises deactivating the first active BWP in the first BWG and activating the second active BWP in the first BWG.

5. The method of claim 1, wherein the control signals further include signals for switching from the first active BWP in the second BWG to a second active BWP in the second BWG.

6. The method of claim 5, wherein switching from the first active BWP in the second BWG to the second active BWP in the second BWG comprises deactivating the first active BWP in the second BWG and activating the second active BWP in the second BWG.

7. The method of claim 1, wherein the signals for scheduling the data in the first active BWP in the first BWG are received in the first active BWP in the first BWG and the signals for scheduling the data in the first active BWP in the second BWG are received in the first active BWP in the second BWG.

8. The method of claim 1, wherein:
more than one BWGs are configured for use over a Uu interface between a base station and a UE; or
more than one BWGs are configured for a sidelink connection between UEs; or
at least one BWG is configured for use over the Uu interface between the base station and the UE and at least one BWG is configured for the sidelink connection between UEs.

9. An apparatus comprising:
at least one processor; and
a processor readable memory, having stored thereon, processor executable instructions, that when executed cause the apparatus to:
transmit or receive data signals and control signals over an air interface on a plurality of bandwidth part (BWP) groups (BWGs) of a carrier, wherein each BWG comprises a plurality of BWPs and each BWP is a set of contiguous resource blocks (RBs), the control signals transmitted or received on an active BWP of at least one of the BWGs, and the data signals transmitted or received on active BWPs of at least two of the BWGs,
wherein the plurality of BWGs comprises at least a first BWG and a second BWG, and the control signals include signals for scheduling data in a first active BWP in the first BWG,
wherein the control signals further include signals for scheduling data in a first active BWP in the second BWG, and
wherein only BWPs in the first BWG include a control resource set (CORESET), and the signals for scheduling the data in the first active BWP in the second BWG are received in the first active BWP in the first BWG.

10. The apparatus of claim 9, wherein at most one BWP in the each BWG of the plurality of BWGs is active at a time for transmitting or receiving.

11. The apparatus of claim 9, wherein the control signals further include signals for switching from the first active BWP in the first BWG to a second active BWP in the first BWG.

12. The apparatus of claim 11, wherein switching from the first active BWP in the first BWG to the second active BWP in the first BWG comprises deactivating the first active BWP in the first BWG and activating the second active BWP in the first BWG.

13. The apparatus of claim 9, wherein the control signals further include signals for switching from the first active BWP in the second BWG to a second active BWP in the second BWG.

14. The apparatus of claim 13, wherein switching from the first active BWP in the second BWG to the second active BWP in the second BWG comprises deactivating the first active BWP in the second BWG and activating the second active BWP in the second BWG.

15. The apparatus of claim 9, wherein the signals for scheduling the data in the first active BWP in the first BWG are received in the first active BWP in the first BWG and the signals for scheduling the data in the first active BWP in the second BWG are received in the first active BWP in the second BWG.

16. The apparatus of claim 9, wherein:
more than one BWGs are configured for use over a Uu interface between a base station and a UE; or
more than one BWGs are configured for a sidelink connection between UEs; or
at least one BWG is configured for use over the Uu interface between the base station and the UE and at least one BWG is configured for the sidelink connection between UEs.

17. A radio access network device comprising:
at least one processor; and
a processor readable memory, having stored thereon, processor executable instructions, that when executed cause the radio access network device to:
transmit or receive data signals and control signals over an air interface on a plurality of bandwidth part (BWP) groups (BWGs) of a carrier, wherein each BWG comprises a plurality of BWPs and each BWP is a set of contiguous resource blocks (RBs), the control signals transmitted or received on an active BWP of at least one of the BWGs, and the data signals transmitted or received on active BWPs of at least two of the BWGs,
wherein the plurality of BWGs comprises at least a first BWG and a second BWG, and the control signals include signals for scheduling data in a first active BWP in the first BWG,
wherein the control signals further include signals for scheduling data in a first active BWP in the second BWG, and
wherein only BWPs in the first BWG include a control resource set (CORESET), and the signals for scheduling the data in the first active BWP in the second BWG are received in the first active BWP in the first BWG.

18. The radio access network device of claim 17, wherein at most one BWP in the each BWG of the plurality of BWGs is active at a time for transmitting or receiving.

19. The radio access network device of claim 17, wherein the control signals further include signals for switching from the first active BWP in the first BWG to a second active BWP in the first BWG.

20. The radio access network device of claim 19, wherein switching from the first active BWP in the first BWG to the second active BWP in the first BWG comprises deactivating the first active BWP in the first BWG and activating the second active BWP in the first BWG.

21. The radio access network device of claim 17, wherein the control signals further include signals for switching from the first active BWP in the second BWG to a second active BWP in the second BWG.

22. The radio access network device of claim 21, wherein switching from the first active BWP in the second BWG to the second active BWP in the second BWG comprises deactivating the first active BWP in the second BWG and activating the second active BWP in the second BWG.

23. The radio access network device of claim 17, wherein the signals for scheduling the data in the first active BWP in the first BWG are received in the first active BWP in the first BWG and the signals for scheduling the data in the first active BWP in the second BWG are received in the first active BWP in the second BWG.

24. The radio access network device of claim 17, wherein:
more than one BWGs are configured for use over a Uu interface between a base station and a UE; or
more than one BWGs are configured for a sidelink connection between UEs; or
at least one BWG is configured for use over the Uu interface between the base station and the UE and at least one BWG is configured for the sidelink connection between UEs.

* * * * *